US008245928B2

(12) United States Patent
Warren

(10) Patent No.: US 8,245,928 B2
(45) Date of Patent: Aug. 21, 2012

(54) DUAL BAND THREAT WARNING SYSTEM

(75) Inventor: Michael C. Warren, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 455 days.

(21) Appl. No.: 12/582,513

(22) Filed: Oct. 20, 2009

(65) Prior Publication Data

US 2011/0127328 A1 Jun. 2, 2011

Related U.S. Application Data

(60) Provisional application No. 61/107,882, filed on Oct. 23, 2008.

(51) Int. Cl.
*G06F 19/00* (2011.01)
*G06G 7/80* (2006.01)
(52) U.S. Cl. ........ 235/411; 235/400
(58) Field of Classification Search ........ 235/400–418; 244/3.1–3.3
See application file for complete search history.

(56) References Cited

U.S. PATENT DOCUMENTS

| | | | | |
|---|---|---|---|---|
| 4,925,129 A * | 5/1990 | Salkeld et al. | | 244/3.11 |
| 5,061,930 A * | 10/1991 | Nathanson et al. | | 342/13 |
| 6,043,867 A * | 3/2000 | Saban | | 356/5.01 |
| 6,720,907 B1 * | 4/2004 | Miron | | 342/52 |
| 7,492,308 B2 * | 2/2009 | Benayahu et al. | | 342/52 |
| 8,106,340 B1 * | 1/2012 | Diaz et al. | | 244/3.15 |
| 2006/0097102 A1 * | 5/2006 | Chang | | 244/3.19 |
| 2008/0191926 A1 * | 8/2008 | Benayahu et al. | | 342/52 |
| 2010/0026554 A1 * | 2/2010 | Longman et al. | | 342/62 |

* cited by examiner

*Primary Examiner* — Jamara Franklin
(74) *Attorney, Agent, or Firm* — Birch, Stewart, Kolasch & Birch, LLP

(57) ABSTRACT

A system and method for dual-band detection of incoming threats using an initial passive detection system and a selectively activated active detection system. Advantages include improved threat detection accuracy, reduction of false alarms, and reduced radiation emission from the active system, thereby making the active system more difficult to detect and reducing irradiation levels of users and bystanders. Variations include systems employing passive optical or electro-optical detectors, systems employing active RADAR or LADAR detectors, and systems connected to alarm signal/threat mitigation systems. The system may be configured for use on ground vehicles or small watercraft. Variations of the system may be specifically configured to detect incoming munitions launches.

34 Claims, 4 Drawing Sheets

DUAL BAND THREAT WARNING SYSTEM

CROSS REFERENCE TO RELATED APPLICATIONS

This nonprovisional application claims the benefit of U.S. Provisional Application No. 61/107,882 filed on Oct. 23, 2008. The entire contents of the above application is hereby incorporated by reference.

BACKGROUND OF THE INVENTION

1. Field of the Invention

The present invention relates generally to the detection of incoming threats and, more particularly, to methods and devices for both passively and actively detecting and tracking incoming threats such as rockets or missiles.

2. Description of Related Art

Military vehicles, both ground and air, require defensive systems to warn or automatically defend against attacks by rockets or missiles. These defensive systems require sensors that detect an incoming threat and determine whether the threat is real or not. If the threat is real, a defensive system may initiate countermeasures to defeat the threat or issue warnings to the crew to evade the threat.

Previous defensive systems have relied upon optical sensors or radar sensors to detect and track threats. Current systems only employ a single type of sensor—radar type or optical type. This limits the scope and speed of responses or actions possible for a system because of several issues, including the approach speed of a threat. Such difficulties are especially pronounced with respect to identifying and evading or mitigating incoming rockets or similar high-speed guided or un-guided munitions. A warning system combining multiple sensor types into a single system would represent a significant improvement over the current art by enabling faster acquisition of more data about the threat and therefore allowing for a reduced false alarm rate and an improved threat response.

Other advantages may include a reduction in radiation emission due to a selectively triggered active detection system. This may reduce radiation hazard to system operators or other individuals in its vicinity as well as reduce the likelihood that the system, or a vehicle carrying the system, may be detected by hostile forces as a result of its radiation emissions.

INVENTION SUMMARY

Embodiments of the present invention pertains to a multi-band sensor and fire control system. The operating bands may be configured in the optical and radar spectra, but other embodiments of the present invention may employ alternate operating bands or alternate operating spectra, including bands that cross spectra (i.e. a band that covers visible and infra-red spectra). Yet further embodiments may employ three or more spectral bands or sensory technologies, such as a combination of visible, infra-red, radar, sonar, ultra-violet, laser, or any other sensing spectrum or system.

In one embodiment of the present invention, a passive optical sensor may be used to detect a launch of a potential threat and establish its location in an image plane. Upon detection of a potential threat, the optical sensor may send the detection and location information to a tracking and control portion of the device. The control processor may then activate a radar transmitter and direct the radar beam to the correct coordinates to intercept the potential threat. The radar may then determine the speed, direction, and range of the potential threat. If the threat is determined to be real, the control processor may then determine which, if any, countermeasure to fire to intercept the incoming threat and provide the firing command to the countermeasures and/or signal appropriate warnings to the crew or suggest or engage appropriate evasive actions. If the threat is determined to be false, the radar is deactivated and the system returns to the passive optical surveillance mode.

Alternate embodiments may employ passive infra-red, millimeter-wave, or ultra-violet detectors. Yet further embodiments may employ multiple optical sensors or multiple portions of a single sensor for detection or monitoring in certain specific electro-optical wavebands or for particular polarizations, or combinations of the two. Yet further embodiments may employ an active sonar or laser ranging system or any other suitable means for determining the position and trajectory of a target.

One embodiment of the present invention may be designed specifically for ground vehicle defense against RPGs (rocket propelled grenades). Such an embodiment of the invention may not require exquisite accuracy in azimuth and elevation but may require an accuracy of plus or minus three feet in the range measurement by the radar in order to trigger any appropriate countermeasures accurately. Appropriate countermeasures may include non-lethal shot projectors that throw shot in a wide pattern to intercept and destroy or detonate an incoming RPG. An embodiment of the present invention may also determine an expected impact location relative to the vehicle carrying the inventive system for more accurate and effective countermeasures deployment.

A sensor system according to the present invention configured for the above inventive embodiment may include an optical sensor system surrounded by a radar sensor system, with both systems potentially sharing a common set of electronic components. In one such embodiment, both systems may have a 360 by 60 degree field of view. Alternate embodiments of the present invention may have different fields of view depending on their specific application or configuration needs. One potential alternative embodiment may be an optical system with a 360 by 120 field of view and two separate range-finding systems, each with a non-overlapping 360 by 60 degree field of view. In yet further alternative embodiments, the field of view and configuration of the initial detection and ranging portions may be reversed or otherwise configured based on the operating and deployment requirements of the system. In embodiments where the detection and ranging systems operate on different technologies (i.e. millimeter-wave and sonar), it may be advantageous to use fewer shared components. In embodiments where the system is expected to be subject to damage from environmental or other factors, it may be advantageous to include redundant or otherwise fault-tolerant components in either or both sensors and/or in the electronics, By combining detection and ranging sensors into a single system, embodiments of the present invention provide a number of advantages. In the radar and optical embodiment, both optical and radar systems produce false alarms. By requiring both an optical signature and radar signature together to identify a threat, the present invention reduces the false alarm rate to near zero. Radar only systems must transmit continuously to detect threats. The radar signal can be detected and the vehicle attacked. In addition, the constant radar emissions can create radiation hazards to nearby humans if they are exposed for a significant period of time. This embodiment of the inventive device is passive until a potential threat is optically identified. Only then is the radar activated and then only for the period of time needed to detect the threat.

The use of multiple, distinct detection bands in the present invention improves the detection of threats. All band signatures are required to confirm an attack. This feature is what reduces the false alarm rate. Further, by having at least one of the bands configured for passive detection and at least one band for active detection and only engaging the active detection system in response to a target acquired by the passive detection system, the present invention realizes the benefits of an active detection system while preventing others from easily or readily identifying the source of the active detection system. Embodiments of the present invention therefore provide accurate detection of potential threats or targets with a low false alarm rate.

Embodiments of the present invention also allow for a sensor system that realizes the benefits of an active detection paradigm while mitigating some of the downsides of that paradigm (specifically, reducing chances of detection and location of the active system by engaging active detection only for short periods and only after detection of a target or threat by the passive system).

Embodiments of the present invention may also include programmable components or sensor and/or control components that interact with programmable media or have particular operating parameters established or stored in computer-readable storage media included in or otherwise operationally interacting with part of all of a system according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF DRAWINGS

The present invention will become more fully understood from the detailed description given herein below and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
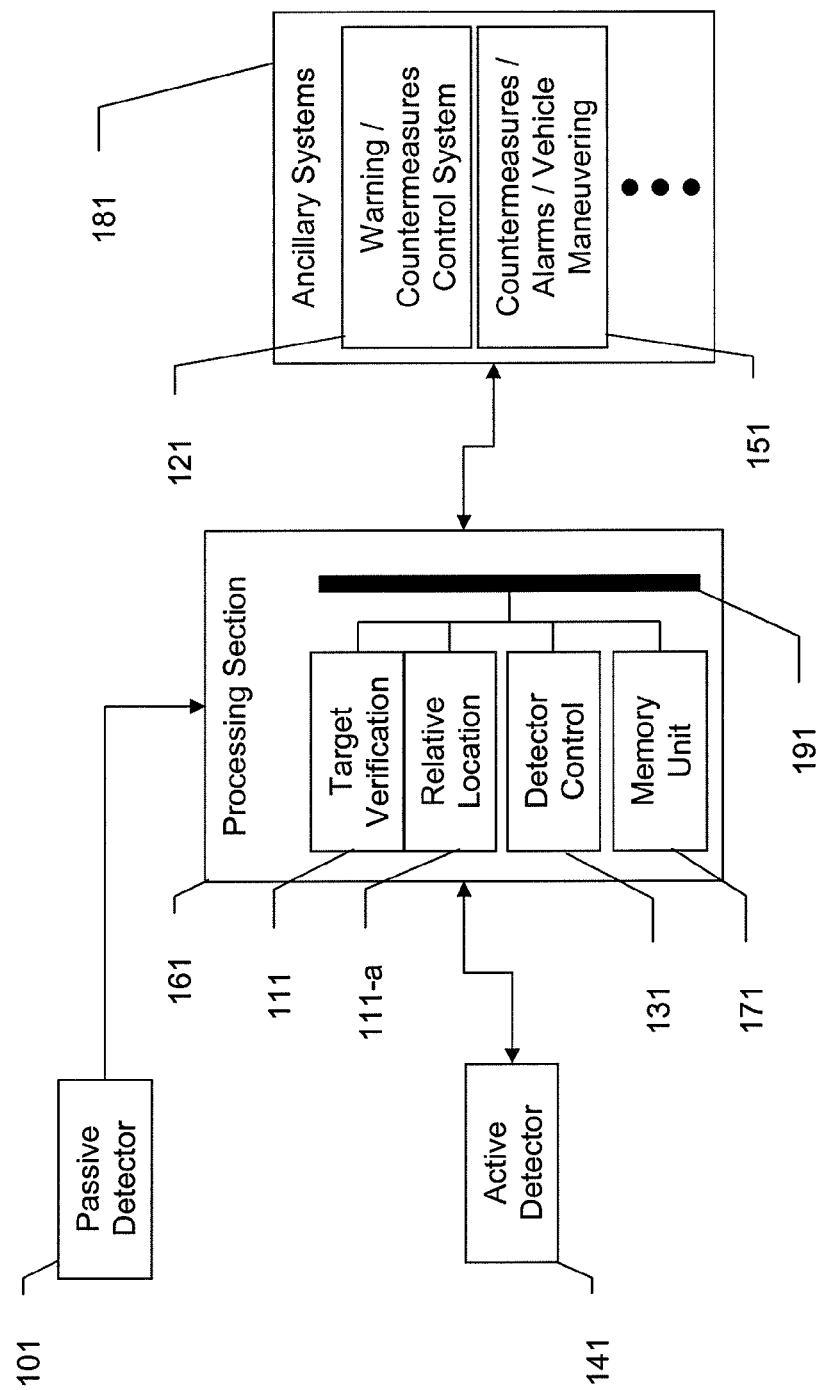
FIG. 1 shows a block diagram of an embodiment of a detector system according to the present invention.

An embodiment of the present invention may include components depicted in FIG. 1. A passive optical detector 101 may be continually operating or may be manually activated when the system is engaged and prepared for operation. This may be a passive optical detector operable in visible, millimeter wave, infra-red or ultra-violet depending on the particular operating environment and threat or threat types being detected. Embodiments for land vehicles operating in urban areas may be equipped with a visible spectrum or an infra-red passive detector to detect launches of munitions such as rocket-propelled grenades (RPGs). Embodiments for sea or air vehicles, or man-portable variants, may be equipped with a different passive sensor system or suite of systems, such as millimeter-wave detectors to identify metal objects, passive sonar to detect mechanically-created noises, or laser detectors that may indicate if the vehicle is being marked for a semi-active laser weapon.

One specific embodiment may include 360-degree optical detector configured to detect light wavelengths associated with the combustion of particular propellants known to be used for anti-tank missiles or rocket-propelled grenades. Such a detector is described and discussed in, for example, U.S. patent application Ser. No. 12/073,679, by Michael Warren, filed on Mar. 7, 2008, the entire contents of which are hereby incorporated by reference.

Embodiments of a passive detector 101 may be connected to a processing section 161 that includes a target verification unit 111 to determine if an event detected by the passive detector 101 is a target-related or threat-related event. If the event is target or threat related, a detector control unit 161 in the processing section 161 may be triggered to engage an active detector 141.

One embodiment of a passive detector may include an optical sensor that incorporates a Magneto Optic Filter that provides a very narrow pass band (25 milli-angstroms) centered at the potassium wavelength (769 nanometers). This pass band transmits light produced by many rocket motor propulsion chemicals. An embodiment of such a first discriminator (passive detector) is described in U.S. patent application Ser. No. 12/073,679.

Embodiments of this type may be configured to detect very short duration threat signatures (e.g. a launch flash of under 20 milliseconds in duration) associated with similarly short attack times (launch-to-hit times of less than 2 seconds and potentially as low as 0.1 seconds or less). In an embodiment with a latency of one video frame (approximately 0.01 seconds), a bright spot at least four pixels in size may be sufficient to engage the active detector 141.

Embodiments may also be equipped with a relative location mapping and computation aspect 111-a. In such embodiments, the passive detector 101 may determine the azimuth (and elevation) angle, relative to the vehicle monitored, of a potential threat. Such line of sight information may be stored, along with related image data, in a memory unit 171 contained in the processing section. This information may be provided to the detector control 131 unit so that it may orient the active detector 141 appropriately upon activation.

Alternate embodiments may be configured such that the active detector 141 scans the entire field of view covered by the passive detector 101 without receiving specific orientation directions based on the passive detection. Some embodiments configured for full field-of-view active scanning may still receive spatial confirmation from a passive detector.

Additionally, line of sight information may be used to verify and compare a detection event from the active sensor 141 against the event detected by the passive sensor 101 so that the target verification unit 111 may better determine if an actual threat or target has been detected or not.

In some embodiments, after the active detector 141 is engaged, the passive detector may continue to monitor the threat detection location and determine if the passively detected threat signature remains present. In embodiments configured for detection of rocket or missile launch events, a passive optical detector 101 may continue monitoring the initial launch detection location to determine if the launch signature disappears within approximately 3 video frames (about 0.03 seconds).

Based on currently known properties of rocket propellants, a flash time of less than 0.03 seconds may be used to confirm that the time signature of the threat is as expected. In such embodiments, if the time signature matches expectations, the active detector 141 may remain activated for a pre-determined time or until a threat velocity and direction are also determined to be within an expected threat signature.

Embodiments of continued active and/or passive detection information may be passed to an embodiment of a target verification unit 111 that, upon determining if the detection results match expected threat signatures, may indicate activation or arming ancillary systems 181 that include countermeasures 151 and their associated control systems 121. In further embodiments, if the target verification unit 111 determines, from passive detector 101 results, that a threat signature duration is outside of the expected signature duration, the detector control 131 may de-activate the active sensor or, in embodiments configured to detect and process multiple threats, switch the active sensor to the next (in time and space) potential threat.

Further embodiments of target verification 111 may include temporal integration functionality or components to integrate multiple passive detections and provide improved detection capability (such as sub-pixel resolution). Yet further embodiments may include spatial integration functionality or components to integrate the detection results of a passive and an active detector into a combined detection result having improved accuracy.

The various components of an embodiment of a processing section 161 may communicate via a shared or system bus 191 that permits the various components to exchange information and control signals. Alternate embodiments may be wirelessly connected or may have specific, hard-wired connections between the components. Yet further embodiments may be realized as part of a broader or more general purpose processing system that includes specialized components or stored instructions in order to accomplish the necessary processing functions.

Embodiments of an active detector 141 may be oriented in a direction identified by the passive detector 101 or may be omni-directional. An embodiment of an active detector 141 may be used to determine the position, relative velocity, and expected trajectory of an object detected by the passive detector 101. Based on this determination of position, velocity, and trajectory, the target verification unit 111 may make a determination of whether the object is expected to impact the system or a vehicle or person carrying or monitored by the system. Further embodiments of an active detector 141 may also acquire information such as size or shape or material composition to facilitate more accurate determination of what an inbound object might be (e.g. a grenade or a rock).

In the event the detection results of the active detector 141 are not determined to be associated with a threat, the active detector 141 may be de-activated and the system may return to a passive detection mode. If the active detector 141 is deemed to have detected a threat, however, the processing section 161 may trigger one of several ancillary systems 181, such as a warning or countermeasures control system 121 that receives information about the detected threat.

Active detector activation, orientation, and de-activation may be controlled by a detector control unit 131. In some embodiments, the detector control components may be included with or otherwise integrated into the active detector 141. In other embodiments, the detector control 131 may be a portion of the target verification 111 unit or may otherwise be a set of components incorporated into a processing section 161 that provides shared control and monitoring for both active and passive detection systems. Similarly, the target verification unit 111 may be a shared component set utilized by both active and passive sensor systems or, in alternate embodiments, may contain or be composed of components specifically dedicated for an active or passive detection system. Embodiments of said components may include programmable components or other storage-equipped or storage-capable units 171 or storage media that contain operating instructions or parameters associated with a detector, control system, or verification module.

Embodiments of ancillary systems 181 may receive a combination of the initial passive and active detection information or may receive only the active detection information to establish an initial threat location and movement direction. Further embodiments may also receive further information such as object size or shape. Alternate embodiments of ancillary systems, such as a countermeasures control system 121, may direct or otherwise control the active and/or passive detectors to acquire position, relative velocity, and expected trajectory information for a verified threat. An embodiment of a countermeasures control system may cause the active detector to track a verified threat and use that tracking information to determine an appropriate response or range of responses. Embodiments of such tracking components may include spatial integration functionality that combines detection results of a passive and an active detector into a combined detection result having improved accuracy, allowing for improved tracking and identification capability.

Embodiments of an ancillary system 181 may also include components incorporated into a unit that provides shared control and monitoring for both active and passive detection systems. Embodiments of said components may include programmable components or other storage-equipped or storage-capable devices or storage media that contain operating instructions or parameters associated with a detector, control system, or verification module.

Embodiments of ancillary systems 181 may include one or more countermeasure or avoidance systems 151 that may be triggered based on a detected and verified threat. Such systems may include notifications of incoming threats, suggested evasive or counter-strike maneuvers, or automated responses that do not require any user or operator interaction.

An embodiment of an automated response may include firing a weapon or employing some other munition or device to detonate or disable the incoming threat. Embodiments of munitions and devices may include explosive charges, projectiles, flares, chaff, and/or energy devices such as laser or microwave emitters that may either disable, detonate, or deceive the incoming threat.

Alternate embodiments of an automated response may include triggering an evasive maneuver such as swerving, stopping, or otherwise altering the course of a vehicle associated with or equipped with an embodiment of a detection system according to the present invention. Embodiments of notifications may include warning lights, displays showing an incoming threat, audible alerts, and/or combinations thereof.

Embodiments of suggested threat responses may include indicators to activate particular systems or weapons, maneuver a vehicle in certain ways, or combinations thereof. In some embodiments, pre-selected responses may be offered to a user for selection and a particular response that includes some combination of countermeasures and/or evasive maneuvers may be automatically executed based on a user selection.

Figure 2:
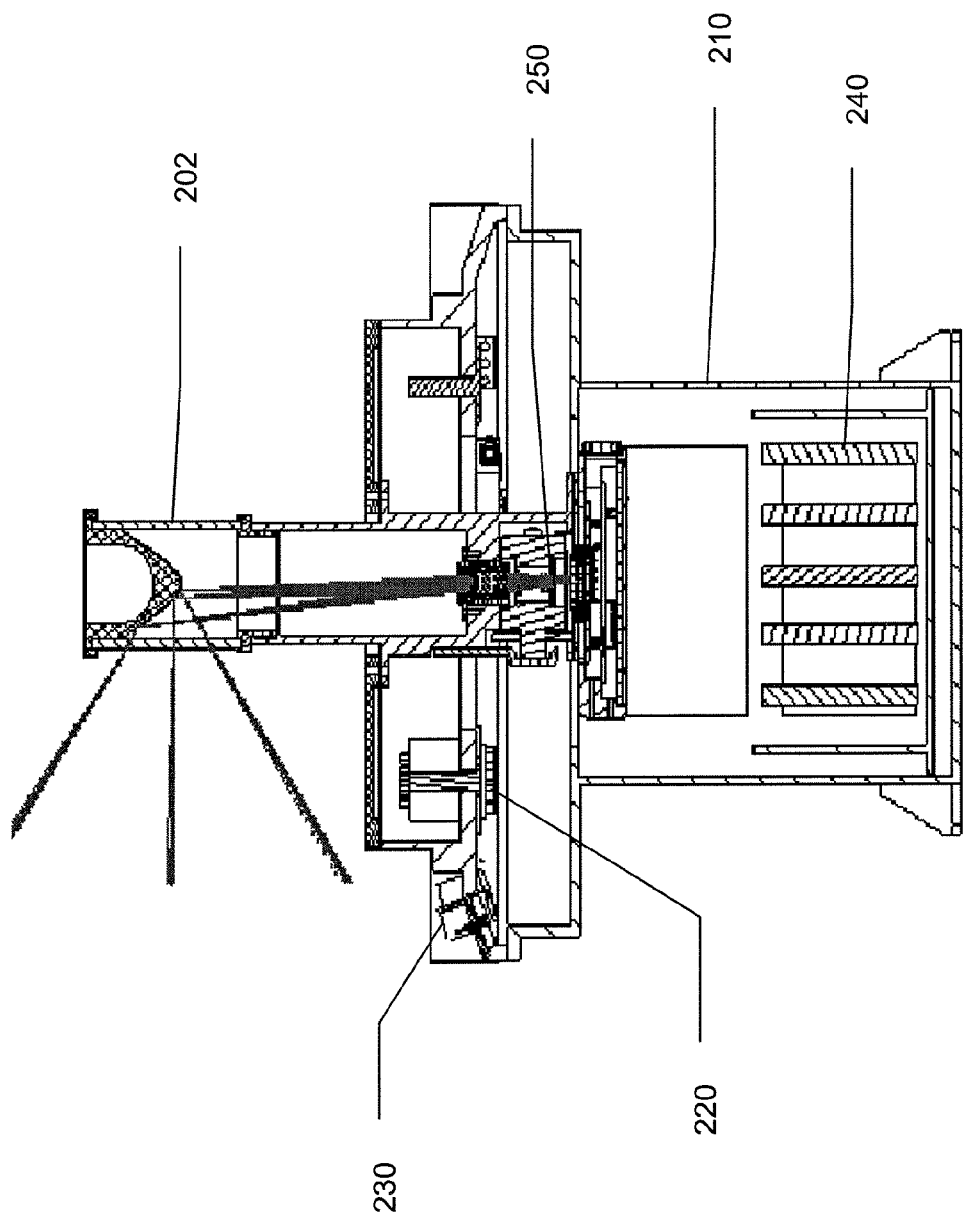
FIG. 2 shows a radar/optical dual-spectrum embodiment of a detector system according to the present invention.

FIG. 2 depicts one particular embodiment of the system described in FIG. 1. The specific embodiment shown is a dual-band system with a passive, omni-directional optical detector 202, 250 and an active, omni-directional radar system 220, 230. The target detection/verification, detector control, and countermeasures control systems are contained in a common set of electronic components 240 shared by both detector systems and operably connected to countermeasures and/or vehicle maneuvering systems (not shown).

In the embodiment depicted, the optical detector 202 has a 360-degree by 60-degree field of view (horizon±30 degrees). Alternate embodiments may employ optical detectors having different fields of view, including ones that scan as little as ±5 degrees from the horizon or ones that have as much as 180 degrees of vertical field of view. Yet further embodiments of an optical detector may include semi-active detector types such as one with less than 360 degrees horizontal field of view that must be rotated for omni-directional detection. Further embodiments still may employ multiple passive optical detectors with directly adjacent or overlapping fields of view. One such embodiment may include configurable arrays of passive detectors that may be arranged for overlapping fields of view to allow for multiple initial threat or target detections, which may improve initial target verification results and allow for reductions in active detector use, further reducing the likelihood that the system will operate long enough to be detected and located or identified based on the active sensor emissions. Further embodiments still may have a common set of optical detection equipment 250 connected with multiple sets of optics 202 having different fields of view in different or overlapping directions.

Embodiments configured for ground vehicle protection may employ passive detectors with a somewhat greater than hemispherical coverage, which is realizable by design. Some such embodiments may, for cost considerations, employ a greater-than-hemispherical passive optical detector with a fixed focus and fixed field of regard. Such embodiments may reduce cost, weight, and areas of potential component failure without significant sacrifices in accuracy and adaptability in applications meant to detect relatively close-range launches of munitions such as rocket-propelled grenades or man-portable anti-tank missiles, which may have launch-to-impact times significantly shorter than the focus or tracking adjustment speed of most optical systems.

The embodiment depicted employs a visible-spectrum optical detector as a passive detector. Alternate embodiments may employ passive infra-red, millimeter-wave, or ultra-violet detectors. Some embodiments may have multiple passive detectors in multiple wavebands, such as separate visible spectrum wavebands, mid-wave infra-red, short-wave infra-red, millimeter-wave, ultra-violet, long-wave infra red, or any other suitable combination thereof depending on what the system is intended to detect and the operating environment it is configured for. Some embodiments may also employ spectral filtering techniques to detect only certain specific wavelengths or wavebands within a particular spectrum. Some such embodiments may be configured to only detect those portions of the visible or infra-red spectra associated with combustion of certain chemicals or chemical mixtures, such as those contained in solid or liquid propellants commonly used for missiles or rocket-propelled grenades or similar devices.

In the embodiment depicted, the active detector is a radar system with a 360-degree by 60-degree (horizon±30 degrees) antenna 230 and associated RF components 220. Alternate embodiments may include antennas with different fields of view, including ones that scan as little as ±5 degrees from the horizon or ones that have as much as 180 degrees of vertical field of view. Yet further embodiments of a radar detector may include steerable detector types such as one with less than 360 degrees horizontal field of view that must be rotated for omni-directional detection. Further embodiments still may employ multiple active detectors with directly adjacent or overlapping fields of view. One such embodiment may include configurable radar arrays that may be arranged for overlapping fields of view to allow for better scene coverage or improved detection quality. Further embodiments still may have a common set of RF components 220 connected with multiple radar antennas 230 or antenna arrays having different fields of view in different or overlapping directions.

The embodiment depicted employs radar as an active detection system. Alternate embodiments may employ sonar, laser-based ranging systems, active millimeter-wave systems, or any other suitable active detection system depending on the types of targets and operating environment an embodiment is configured for. Yet further embodiments may combine multiple active detection systems, such as a combined radar/sonar or radar/laser system. Yet further embodiments may include multiple radar or laser or millimeter wave systems, or combinations thereof, having specific polarizations.

Yet further embodiments may include spatial or temporal integration components (not shown) that may combine multiple passive detection frames for improved passive detection resolution or that may combine passive detection and active detection results for improved target or threat detection and tracking. In embodiments having multiple passive or active detection systems, one or more passive systems may be associated with a temporal integration system or approach and/or two or more active systems or at least one active and at least one passive detection system may be associated with a spatial integration system or approach to produce improved, combined detection results.

The embodiment depicted employs a common set of electronic components 240 as one cohesive unit that combines a significant portion of the operation, control, and signal processing components required for control of the detector systems, recognition of targets or threats, and activation and control of countermeasures. Embodiments of a common suite of electronic components may include a power supply and a common signal and fire control processor. Alternate embodiments may also include spatial or temporal integration components or may have data interface points included in the common electronic components. Embodiments of such data interface points may allow for user configuration or parameter selection of various components based on operating environment or user preference. In some embodiments, the system may have a manual override feature that may be enabled or disabled. Embodiments of such a manual override option may allow for selective activation of an automated response system or the complete de-activation of any automated response beyond an alarm indicator.

In the embodiment shown, the detectors and electronics are housed as a complete system inside a casing 210. Embodiments of the casing may be made of aluminum. Alternate embodiments could be made of any reasonable material. Some embodiments may be made of steel armor sufficient to withstand small arms fire and shrapnel damage to the interior of the equipment. Embodiments of such a system may be mounted on a vehicle or a structure, or may be man-portable or semi-portable (i.e. vehicle-towed). Alternate embodiments of such systems may be integrated directly into the construction of a vehicle or a structure.

Yet further embodiments may be composed of modular components that perform according to the present invention when connected and configured to do so. An example of such an embodiment may include a sensor suite on an armored vehicle, a jet, or a field command or communications center. Such a vehicle or structure may already have a 360-degree capable passive optical system and an active radar or laser ranging system. Equipping it with an appropriate suite of control electronics, or configuring the existing control electronics, may allow these active and passive systems to work in tandem as a threat or target detection system according to the present invention.

Figure 3:
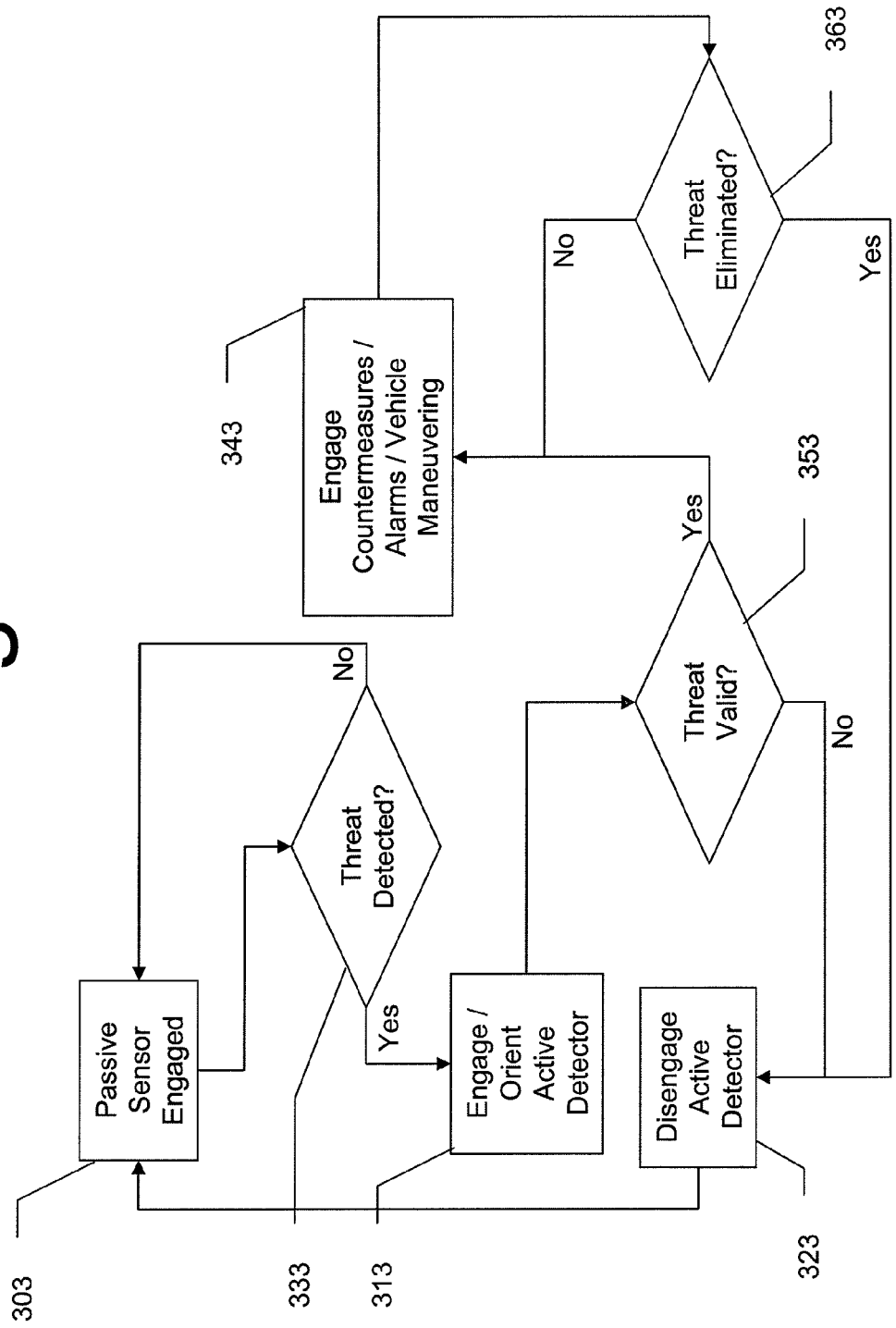
FIG. 3 shows an embodiment of an activation and operating sequence for a detector system according to the present invention.

An embodiment of an operational sequence associated with a detection system according to the present invention is depicted in FIG. 3. When operating, the system begins in a stand-by state where the passive sensor (or sensors) is engaged 303 and looking for potential threats. Until a potential threat is detected 333 the system remains in a passive, stand-by state that only employs passive detection systems 303. When a potential threat is detected 333 by the passive detector(s), the system engages one or more active detectors 313 and, if applicable, orients or otherwise directs their focus towards the position of the potential threat detected by the passive system(s).

The detection results of the active detector(s) are then evaluated and compared with the passive detection results to determine if the potential threat is valid or a false alarm 353. If the threat is determined to be a false alarm, the active detector is disengaged 323 and the system returns to a stand-by mode of passive detection 303. If, however, the threat is determined to be valid, the system may trigger an alarm of engage other appropriate warnings or counter-measures 343. In some embodiments, the system may engage or suggest activation of an active countermeasure system such as an anti-missile or anti-personnel system designed to disable or deflect the incoming threat. In other embodiments, the system may perform or suggest a series of evasive or defensive maneuvers to avoid or deflect the incoming threat. In yet further embodiments, the system may simply indicate that a threat is inbound and indicate that the vehicle occupants or operators should prepare for impact.

In some embodiments, the system may continue tracking the threat while counter-measures or evasive maneuvers are performed or indicated. In such embodiments, if the threat is determined to still be present 363 after a system response, the system may engage in a second round of anti-threat responses 343. Systems equipped with threat-neutralization devices may, for instance, engage a secondary threat neutralization device or proceed to evasive maneuvers if the threat neutralization device is deemed ineffective. Embodiments of systems may also be configured to attempt or suggest evasive maneuvers prior to employing threat neutralization devices or may have a predetermined range and sequence of responses and response alternatives depending on the type and nature of the detected threat. Once the threat is determined to be eliminated or is otherwise no longer viable, the active detector(s) may be disengaged 323 and the system returned to a stand-by state of passive detection 303.

Figure 4:
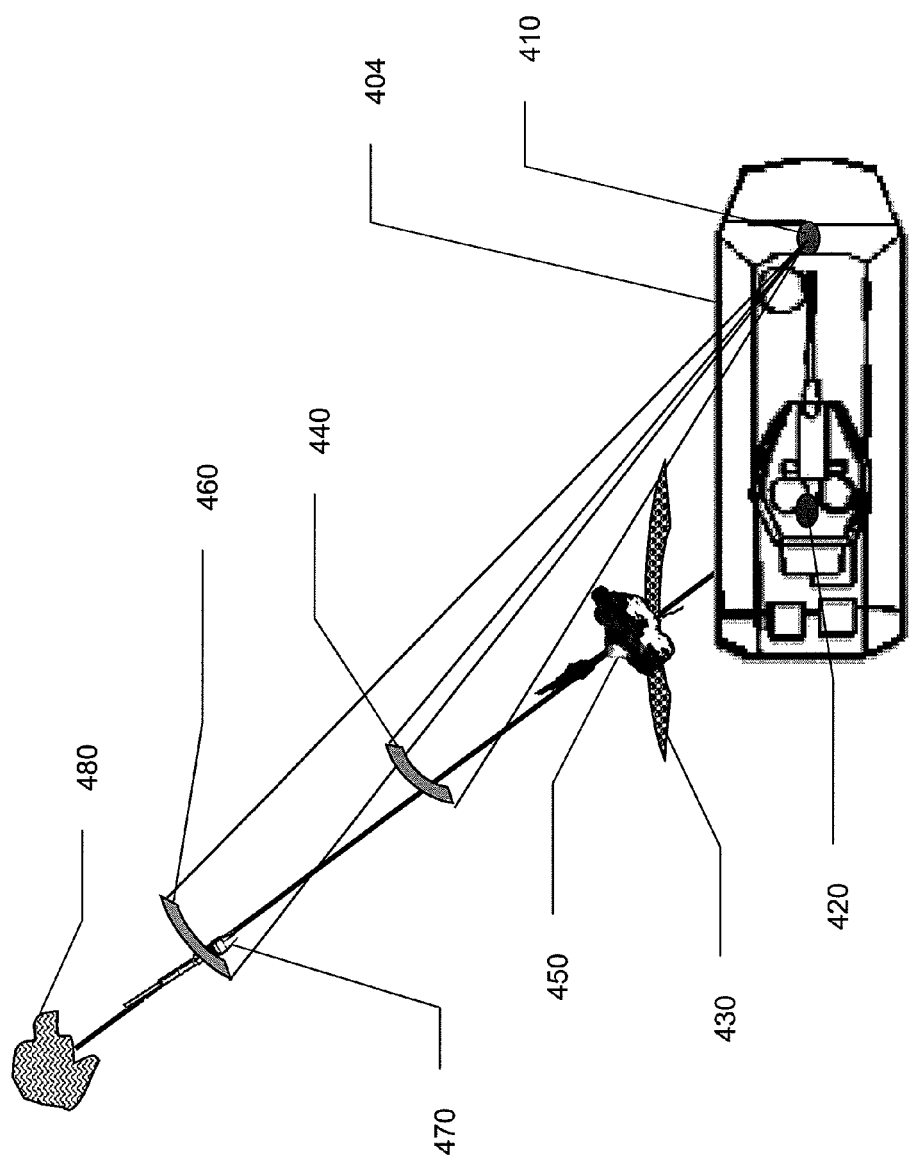
FIG. 4 shows an embodiment of a detector system operating sequence for an embodiment of a system mounted on a ground vehicle.

FIG. 4. depicts an embodiment of a detection and response sequence for a ground vehicle 404 equipped with an embodiment of the system discussed herein 410. The passive detection portion of the system 410 may detect the launch 480 of an anti-tank missile 470 or similar weapon. Such detection may be made, in some embodiments, by optical detection of specific wavelengths associated with the combustion of fuels known to be used in such devices. Alternate embodiments may detect infra-red signatures or may track moving objects and determine their approximate speed and trajectory relative to the system or a vehicle equipped with or monitored by the system.

Upon detecting the incoming threat 470 with the passive system, the active detection portion of the system 410 is triggered. The active detection aspect is oriented or otherwise directed to detect the potential incoming threat 460 and, if the threat is deemed valid, the active detection aspect tracks the threat 440 to determine its expected trajectory and impact time. Once it is determined where and when the threat will impact the vehicle 404, an active counter-measure system 420 is deployed to neutralize the threat. In the embodiment shown, the counter-measure is a claymore-type device that launches a screen of shot or shrapnel 430 to destroy or detonate the incoming missile 450 before it can strike the vehicle 404. In alternate embodiments, the counter-measure may be flares or an evasive maneuver, a directed electro-magnetic pulse, an anti-missile, or any other suitable threat evasion or neutralization device or maneuver.

In alternative embodiments, cost and threat launch-to-impact times may lead to systems that only measure a threat's velocity and range. In such embodiments, an active detector may simply confirm a threat signature and determine range and velocity during the threat signature confirmation. Such an operation may be performed more quickly than a range calculation and may require less complicated components and algorithms, potentially reducing the overall cost of such embodiments.

Embodiments of a system according to the present disclosure could be used on board a water vessel. Low-cost embodiments similar to those described above may be suitable for small patrol craft that would be vulnerable to attack from the same type of threats as a ground vehicle.

Only exemplary embodiments of the present invention are shown and described in the present disclosure. It is to be understood that the present invention is capable of use in various other combinations and environments and is capable of changes or modifications within the scope of the inventive concept as expressed herein. Such variations are not to be regarded as departure from the spirit and scope of the invention, and all such modifications as would be obvious to one skilled in the art are intended to be included within the scope of the following claims:

The invention claimed is:

1. A method of detecting and tracking a potential threat with a dual-band detection system, the method comprising:
    passively detecting, with a passive detector operating in a first band, a potential threat;
    activating, based on results of said passively detecting, an active detection system that operates in a second band;
    actively detecting, based on a signal of the second band emitted and detected by said active detection system, a range and velocity of the potential threat;
    calculating a time of expected impact of the potential threat based on results of actively detecting; and
    determining if the potential threat is an actual threat based on results of said actively detecting and said calculating.

2. The method of claim 1, said actively detecting further including actively detecting a movement direction of the potential target.

3. The method of claim 1, said passively detecting further including determining a relative location of the potential threat.

4. The method of claim 3, where activating includes orienting the active detection system in a direction associated with the relative location of the potential threat.

5. The method of claim 3, where the passive detector is a 360-degree, fixed field-of-view optical detector and the relative location is an azimuth and elevation angle of the potential threat relative to a vehicle being monitored by said method.

6. The method of claim 1, the method further comprising sending results of said calculating to at least one ancillary system for further processing and action when said determining determines that the potential threat is an actual threat.

7. The method of claim 6, where said further processing and action includes deploying countermeasures to neutralize the actual threat; and
the method further includes de-activating the active detection system after said deploying.

8. The method of claim 1, where passively detecting includes detecting a launch of a munition.

9. The method of claim 1, where:
said passively detecting includes comparing a passive detection result against at least one predetermined passive threat signature and deciding whether the passive detection result has a threat signature associated with a potential threat;
said actively detecting includes comparing an active detection result against at least one predetermined active threat signature; and
said determining includes deciding, based on said comparing an active detection result, whether the active detection result has a threat signature associated with a potential threat.

10. The method of claim 9, where the predetermined passive threat signature includes a light flash with a duration of less than 0.03 seconds.

11. The method of claim 9, where the predetermined active threat signature includes expected or threshold velocity and direction values.

12. The method of claim 1, the method further comprising de-activating the active detection system when determining if the potential threat is an actual threat does not indicate an actual threat.

13. The method of claim 1, where actively detecting includes spatially integrating detection results of passive detection with detection results of the active detector.

14. The method of claim 1, where passively detecting includes magneto-optically filtering incident visible light.

15. The method of claim 14, where magneto-optically filtering includes band-pass filtering with a pass band of 25 milli-angstroms centered at a wavelength of 769 nanometers.

16. The method of claim 1, where actively detecting includes detecting with an active RADAR device.

17. A dual-band detection device for detecting and tracking a potential threat, the device comprising:
a passive detection system operating in a first band, where said passive detection system detects a potential threat;
an active detection system operating in a second band, where said active detection system tracks the potential threat;
a processing section operably connected to the active and passive detection systems, the processing section including:
a target verification unit that determines if the potential threat detected by the passive detection system is a likely real threat;
a detector control unit in communication with the target verification unit such that the detector control unit activates the active detection system to track the likely real threat; and
a memory unit in communication with the target verification and detector control units, said memory unit storing detection data from the active and passive detection systems; where
the target verification unit determines, based on the detection data of the active detection system, a range and velocity of the likely real threat and whether the likely real threat is an actual threat.

18. The device of claim 17, the target verification unit including:
a relative location unit that determines a relative location of the potential threat based on detection results from the passive detection system; and
a time to impact calculator that calculates, based on detection results from the active detection system, an expected impact time of the actual threat.

19. The device of claim 17, where the target verification unit also determines a movement direction of the likely real threat.

20. The device of claim 17, the device further comprising a mitigation system interface unit that passes information about the actual threat to a threat mitigation system.

21. The device of claim 20, wherein the threat mitigation system includes a countermeasures deployment system.

22. The device of claim 17, wherein the passive detection system is a visible-spectrum optical detector.

23. The device of claim 22, where the visible-spectrum optical detector is a detector having a 360-degree horizontal field of view and where the detector includes a magneto-optical filter that band-pass filters incident light with a pass band of 25 milli-angstroms centered at a wavelength of 769 nanometers.

24. The device of claim 23, where the detector has a vertical field of view larger than 90 degrees.

25. The device of claim 17, wherein the active detection system is a RADAR system.

26. The device of claim 17, wherein the passive detection system detector is an infra-red detector.

27. The device of claim 17, where the active detection system is a laser detection and ranging (LADAR) system.

28. The device of claim 17, where the detector control unit de-activates the active detection system when the target verification unit determines that the likely real threat is not an actual threat.

29. The device of claim 17, where the device is installed on a land vehicle.

30. A method for reducing a false alarm rate in a threat detection system, the method comprising:
first detecting, with a passive detection system in a first waveband, a potential threat;
determining if the potential threat is a likely real threat;
activating, in response to a likely real threat, an active detection system in a second waveband;
second detecting, with the active detection system, a range and velocity of said likely real threat; and
determining, based on the results of the first and second detecting steps, if said likely real threat is an actual threat.

31. The method of claim 30, the method further comprising providing actual threat information to a downstream ancillary system for processing and action.

32. The method of claim 30, where the first waveband is a waveband associated with visible light and the second waveband is a waveband associated with radio-frequency waves.

33. The method of claim 30, the method further comprising de-activating the active detection system when the likely real threat is not determined to be an actual threat.

34. A method of selectively activating an active detector of a dual-band threat detection system, the method comprising:

passively detecting, with a passive detector, a potential threat;

determining if the potential threat is a likely real threat;

activating, only in response to a likely real threat, the active detector;

actively detecting, with the active detector, a range and velocity of said likely real threat;

determining, based on the results of the passive and active detecting steps, if said likely real threat is an actual threat; and de-activating the active detector if the likely real threat is not an actual threat;

where the passive detector operates in a first waveband and the active detector operates in a second waveband.

* * * * *